United States Patent Office 3,472,821
Patented Oct. 14, 1969

3,472,821
CATALYTIC PROCESS
Stephen W. Osborn, Yardley, Pa., assignor to Thiokol Chemical Corporation, Bristol, Pa., a corporation of Delaware
No Drawing. Filed July 27, 1962, Ser. No. 213,015
Int. Cl. C08g 23/00
U.S. Cl. 260—79    22 Claims This invention relates to the production of polyepisulfides of relatively high molecular weight. The polyepisulfides of the invention may be either homopolymers or copolymers, depending upon whether one or more than one monomeric episulfide is used as a starting material. The invention also relates to the use of certain metal carbonate catalysts in the polymerization process.

It is an object of the invention to provide a process for making polyepisulfides having high molecular weights. It is another object of the invention to provide novel catalysts adapted to be used in such a polymerization process to produce polyepisulfides having relatively high molecular weights. Other objects of the invention will be in part obvious and in part pointed out hereafter.

A process for preparing polyepisulfides having molecular weights similar to those obtained by the process of the present invention is disclosed in S.N. 162,555, filed on Dec. 27, 1961. That application describes a polymerization process employing certain polymerization catalysts which are the reaction products of diethyl zinc and either water or hydrogen sulfide. These catalysts while quite effective in promoting the polymerization of episulfides to useful high molecular weight materials, suffer however, from certain limitations such as for example, that they must be freshly prepared prior to use and that they must be prepared for and used in polymerization reactions under substantially anhydrous and oxygen-free conditions. Those catalysts are not commercially available, and by their nature cannot conveniently be thus obtained; further, their effective storage life prior to use is sharply limited.

It has now been unexpectedly discovered that certain commercially available metal carbonates will effectively catalyze polymerizations of episulfides to form useful high molecular weight polymeric materials. The specific carbonates which are usefully employed according to this invention are the carbonates of zinc, manganese, cadmium, lead, cobalt and nickel. These catalysts may be used singularly or in combination with one another. The preferred catalyst is zinc carbonate. The present catalysts are effective even in the presence of an oxygen or moisture containing environment, and thus are not subject to the limitation suffered by the diethyl zinc catalysts reported in the aforementioned copending application. Other advantages inherent to the use of the present catalysts involve their extended storage life over that of diethyl zinc catalysts, and also their commercial availability. The catalysts of the present invention are preferably used in a particulate state. It has been found that, generally speaking, the finer the particle size the more reactive is the catalyst. The preferred particle size is of the order of less than one micron.

The present process is generally applicable to the polymerization of episulfide monomers. Typical monomeric episulfides polymerizable by this process are ethylene sulfide, propylene sulfide, 1,2-butylene sulfide, styrene sulfide, allyl thioglycidyl ether, and 2,3-butylene sulfide. Also mixtures of monomeric episulfides may be used as starting materials. In general, the polymers and copolymers produced are insoluble in water and have no more than a very limited solubility in the common organic solvents such as benzene, acetone, hexane and methylene chloride. Certain of the polymers are substantially completely insoluble in these solvents, that is, they are soluble to the extent of less than 1% by weight in the solvents. The polymers are relatively stable in diffused light and stable to prolonged exposure to direct sunlight or ultra-violet radiation.

Homopolymers of ethylene sulfide produced by this process are solid crystalline powders having melting points as high as 208° to 212° C., or higher. They are useful as high temperature molding materials and when melted can be formed into flexible films. Copolymers of ethylene sulfide and propylene sulfide produced by the present proces form valuable extrudable materials. When melted, these copolymers can also be formed into flexible films. Copolymers of propylene sulfide and allyl thioglycidyl ether can be made from monomeric mixtures containing from say 3% to 20% by weight of ether, and such copolymers can be cured by conventional vulcanization techniques to form useful elastomers. Homopolymers of propylene sulfide made by the present process are useful elastomeric materials which may be formed into flexible films.

Details of the polymeriztaion process are given in the specific examples set forth below. In general, the polymerization process if executed by bringing the monomeric episulfide or mixture of episulfides into contact with the catalyst described above. It is preferable, in order to obtain optimum results, that the starting monomeric materials be freshly distilled just prior to use from a reducing agent such as calcium hydride to remove oxidation products. The catalyst is used to the extent of about 1 to 5% by weight of the monomeric material to be polymerized, the preferred amount of catalyst being about 1 to 3% by weight. The polymerization can be carried out satisfactorily at temperatures of 20° to 100° C., the preferred temperature being about 80° C. Depending upon the reaction conditions and the nature of the monomeric material, the reaction may take from a few minutes up to 48 hours or more.

The polymerization reaction may be conducted without using a solvent, as in a bulk process or any of various inert organic solvents can be used in a solution polymerization process such as aromatic hydrocarbons, e.g., benzene, toluene, or xylene; aliphatic hydrocarbons, e.g., isopentane, n-hexane, or octane; or chlorinated hydrocarbons, e.g., carbon tetrachloride, methylene chloride, or ethylene chloride. The solvent is used to help regulate the rate of the reaction, where desired, by aiding in the dissipation of the heat of the reaction. The reaction mixture may be agitated to facilitate the reaction. The pressure at which the reaction is carried out does not appear to be particularly critical. Thus the reaction can be conducted in an open vessel at atmospheric pressure or in a closed vessel under autogenous pressure. In modifications of the process wherein a solvent is used, the reaction vessel is desirably charged with solvent, catalyst and monomer, although this particular order of addition is not critical to the succesful practice of this invention.

In order to point out more fully the nature of the present invention, the following specific examples are given of illustrative methods of making the present products. In many of the experiments the product polymer contained physically bound solvent which was removed by evaporation, as in a vacuum oven at elevated temperatures.

Examples 1 to 11

In these examples the episulfide polymerizations were pursued using various particulate metal carbonate catalysts which had an average particle size of less than one micron. Sealable reaction vessels were charged sequentially with solvents, catalysts, and then monomers in the quantities as are given in Table I. Polymerization was permitted to proceed in the sealed reaction vessels with agitation at the temperatures and times indicated under autogenous pressures of about 40–50 p.s.i.g. The vessels were then cooled, vented to the atmosphere, unsealed, and the solid contents dropped. The pot products were then stripped of solvent by drying under vacuum at about 50° C. for various periods of time. The polymer product properties are as given below in Table I.

TABLE I

| Example | 1 | 2 | 3 | 4 | 5 | 6 | 7 | 8 | 9 | 10 | 11 |
|---|---|---|---|---|---|---|---|---|---|---|---|
| Polymerization charge recipes: | | | | | | | | | | | |
| Monomers: | | | | | | | | | | | |
| Ethylene Sulfide, g | 200.8 | 200.8 | 200.8 | 200.8 | 190.8 | 180.7 | 160.6 | 200.8 | 200.8 | 200.8 | 200.8 |
| Propylene Sulfide, g | | | | | 12.5 | 24.4 | 49.7 | | | | |
| Solvent: Benzene, ml | 200 | 200 | 200 | 200 | 200 | 200 | 200 | 200 | 200 | 200 | 200 |
| Catalyst: | | | | | | | | | | | |
| Zinc carbonate, g | 1.0 | 3.0 | 4.0 | 15.0 | 4.0 | 4.0 | 4.0 | | | | |
| Manganous carbonate, g | | | | | | | | | | | 3.7 |
| Lead carbonate, g | | | | | | | | 8.6 | | | |
| Cadmium carbonate, g | | | | | | | | | 5.5 | | |
| Cobaltous carbonate, g | | | | | | | | | | 3.8 | |
| Polymerization conditions: | | | | | | | | | | | |
| Temperature, °C | 80 | 80 | 80 | 80 | 80 | 80 | 80 | 80 | 80 | 80 | 80 |
| Time, hours | 20 | 4 | 4 | 4 | 4 | 4 | 4 | 4 | 4 | 4 | 3.5 |
| Product isolation conditions: | | | | | | | | | | | |
| Drying temperature, °C | 50 | 50 | 50 | 50 | 50 | 50 | 50 | 50 | 50 | 50 | 50 |
| Drying time, hours | 50 | 24 | 24 | 24 | 24 | 24 | 24 | 24 | 24 | 24 | 24 |
| Polymer product: | | | | | | | | | | | |
| Weight percent yield | 87.9 | 74.8 | 95.6 | 99.5 | 91.1 | 85.5 | 81.2 | 16.7 | 72.2 | 57.9 | 93.8 |
| Melting range, °C | 209–214 | 208–213 | 207–212 | 208–212 | 204–208 | 199–204 | 195–199 | 204–209 | 214–218 | 208–211 | 207–212 |

It is of course to be understood that the foregoing examples are intended to be illustrative only and that numerous changes can be made in the ingredients, proportions and conditions set forth therein without departing from the spirit of the invention as set forth in the appended claims.

I claim:

1. A process comprising polymerizing at least one vicinal episulfide monomer under substantially non-alkaline conditions by contacting the monomer with, as a catalyst, at least one compound selected from the group consisting of the carbonates of manganese, lead, cobalt and nickel.

2. A process as in claim 1 in which the amount of catalyst used is about 1 to 5% by weight of the monomeric charge.

3. A process as in claim 1 in which at least one of said vicinal episulfide monomers is ethylene sulfide.

4. A process as in claim 1 in which at least one of said vicinal episulfide monomers is propylene sulfide.

5. A process as in claim 1 in which a mixture of ethylene sulfide and propylene sulfide is used as the vicinal episulfide monomer.

6. A process comprising polymerizing at least one vicinal episulfide monomer under substantially non-alkaline conditions at a temperature of about 20 to 100° C. in the presence of an inert organic solvent and, as a catalyst, at least one compound selected from the group consisting of the carbonates of managanese, lead, cobalt and nickel.

7. A process as in claim 6 in which said catalyst is manganese carbonate.

8. A process as in claim 6 in which said catalyst is lead carbonate.

9. A process as in claim 6 in which said catalyst is cobalt carbonate.

10. A process as in claim 6 in which said catalyst is nickel carbonate.

11. A process comprising polymerizing ethylene sulfide under substantially non-alkaline conditions at a temperature of about 20 to 100° C. in the presence of, as a catalyst, about 1 to 5% by weight of said ethylene sulfide of at least one compound selected from the group consisting of the carbonates of manganese, lead, cobalt and nickel.

12. A process as in claim 11 in which said catalyst is manganese carbonate.

13. A process as in claim 11 in which said catalyst is lead carbonate.

14. A process as in claim 11 in which said catalyst is cobalt carbonate.

15. A process comprising polymerizing propylene sulfide under substantially non-alkaline conditions at a temperature of about 20 to 100° C. in the presence of, as a catalyst, about 1 to 5% by weight of said propylene sulfide of at least one compound selected from the group consisting of the carbonates of manganese, lead, cobalt and nickel.

16. A process as in claim 15 in which said catalyst is manganese carbonate.

17. A process as in claim 15 in which said catalyst is lead carbonate.

18. A process as in claim 15 in which said catalyst is cobalt carbonate.

19. A process comprising copolymerizing ethylene sulfide and propylene sulfide under substantially non-alkaline conditions at a temperature of about 20 to 100° C. in the presence of, as a catalyst, about 1 to 5% by weight of said ethylene sulfide and said propylene sulfide of at least one compound selected from the group consisting of the carbonates of manganese, lead, cobalt and nickel.

20. A process for the polymerization of at least one vicinal episulphide monomer comprising contacting said episulphide monomer with a polymerization catalyst which is a carbonate of a metal of Group II–B of the Mendeleef Periodic Table under substantially non-alkaline conditions.

21. A process as in claim 20 in which said metal is zinc.

22. A process as in claim 20 in which said metal is cadium.

References Cited

UNITED STATES PATENTS

| 2,183,860 | 12/1939 | Coltof | 260—79 |
| 2,185,660 | 1/1940 | Coltof | 260—79 |
| 3,000,865 | 9/1961 | Gurgiolo | 260—79 |

OTHER REFERENCES

Ohta et al.: "Studies on Ethylene Sulfide I Polymerization of Ethylene Sulfide," as reported in Chem. Abstracts, Vol. 51, 1957, pages 14, 668.

JAMES A. SEIDLECK, Primary Examiner

U.S. Cl. X.R.

260—79.7